Figure 1:
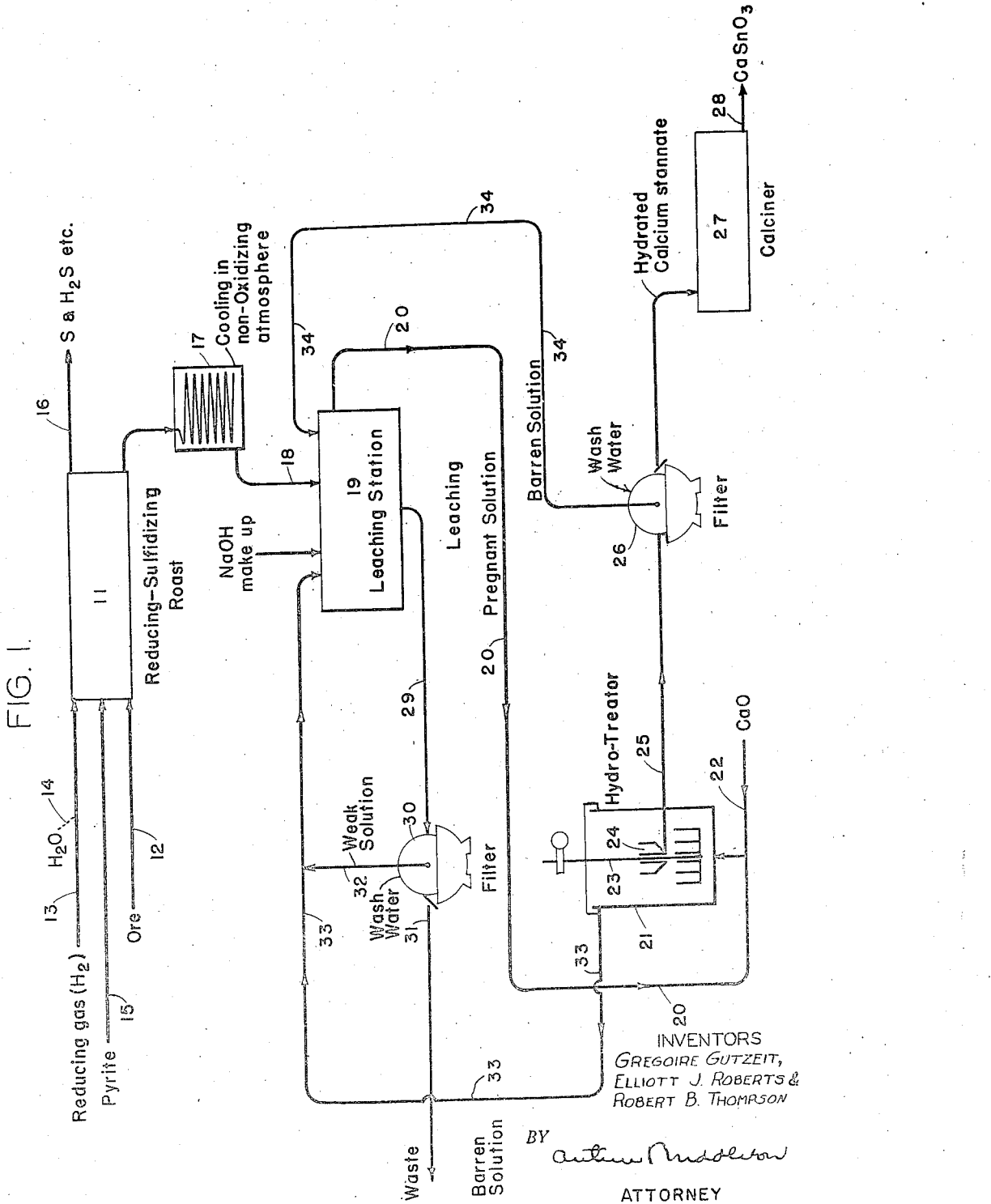

Patented Jan. 7, 1947

2,413,762

UNITED STATES PATENT OFFICE 2,413,762

TIN ORE TREATMENT

Gregoire Gutzeit and Elliott J. Roberts, Westport, and Robert B. Thompson, Wilton, Conn., assignors to The Dorr Company, New York, N. Y., a corporation of Delaware Application January 23, 1943, Serial No. 473,406

6 Claims. (Cl. 23—53)

This invention relates to the recovery of tin and metals of the same class from ores and mill products. It renders specially possible the extraction of tin from refractory ores (complex cassiterite-sulphide ores and ores containing so-called colloidal tin) as well as from the tailings of tin concentrators, although it is not applicable to ores with a carbonate gangue.

Tin occurs principally as the mineral cassiterite, $SnO_2$. As is well known to mining engineers, there are two main types of tin ores: the first one is the so-called stream tin, i. e., an alluvial deposit where the cassiterite particles are generally free; the other type is the lode tin, in which the tin oxide is mostly associated with stannite (tin copper sulphide), pyrites, arsenopyrites, bismuth, antimony, and arsenic sulphides, and often with wolframite. A rarer occurrence is the eluvial tin (French Indo-China, Belgian Congo). The ores of the first types generally yield clean concentrates and fairly good tailings. These are principally found in the Malaya Peninsula and in the Netherland Indies (Banka and Billiton). The second type is more scattered over the world, and is found mainly in Bolivia, Nigeria, Belgian Congo, Cornwall (England), Brittany (France), China, and Indo-China. This type of ore is difficult to concentrate. The losses in the concentration tailings are always very high, especially in the slime fraction where grades of 2.5% Sn and over are not rare. The sulphides are often floated out of the crude ore, but even so the tailings and concentrates still contain more or less base-metal sulphides. In the smelting plant, the concentrates have to be roasted, sometimes recleaned by gravity methods, and leached with hydrochloric acid in order to remove the impurities (excess of iron) prior to the smelting operation proper.

The object of this invention is to recover the tin lost in these concentrator tailings, or even to treat directly the refractory ores as well as any suitable mill product.

Many attempts have been made to leach the tin directly from its ores or from concentrates but these have all failed due to the fact that cassiterite is completely insoluble in all aqueous solutions. (Mantell, "Tin" (1929) A. C. S. Monograph Series, pp. 131–138.) This invention proposes to make use of several important and conjoint stages of treatment of which the first is a reducing sulphidizing roast which results, under critical conditions, in the formation of a soluble tin compound. The second stage comprises cooling the roasted material under non-oxidizing conditions, and the third stage comprises a leaching operation whereby a tin-bearing solution is selectively obtained that can be separated from the gangue residue. Another stage comprises precipitating the tin out of its mother liquor under critical conditions.

Since it is the tin that is the value to be recovered and since the proportion thereof in the ore or other material is small, a high percentage of extraction of the tin is a feature of advantage of this invention. Since tin ore is normally found only in out of the way places in the world, where freight rates are high, the availability of chemical reagents is very important. Another feature of advantage in this invention is the possibility of regeneration of the reagent for reuse.

As the roasting stage: If one attempts to reduce the cassiterite of a tin ore which has a substantial content of iron compounds as well as other base metals in some proportion, the difficulty is faced in that in the process of reducing the tin, iron and/or certain other elements are likely to be reduced to the metallic state. Alloys of the tin and these metals then form and no economical method has yet been found for leaching out tin so alloyed. Therefore, the first object of the roast of this invention is to reduce the tin compound while not reducing the iron, so that the reduced tin compound is made available for subsequent leaching. To that end this invention proposes to use a sulphidizing atmosphere whereby the tin oxide of the ore or ore material is converted from tin oxide principally to stannous sulphide (SnS) which is soluble in a subsequent leaching process. What is perhaps of equal importance, is that the iron and certain other elements are held as, or are converted to, sulphides, from which combination they do not so readily reduce to the metallic state.

The requirements of this sulphidizing roast are that first it must be carried out in an atmosphere of reducing gas such as hydrogen and enough sulphur should be present to convert the tin and possible interfering elements to their sulphides. The sulphur needed is preferably evolved in situ, although it may be added as a gas if desired. The temperature of the roast is important, because if too low, the requisite reactions do not take place, while if too high, tin may be lost through volatilization. Sufficient time must be allowed to convert the major part of the tin into the sulphide, but too long a reaction time should be avoided due to the danger of formation of metallic iron or other metal which would alloy with any metallic tin which may be formed during the process. This is especially true when the sulphur supply is marginal or inadequate. It is practically impossible and is also unnecessary to entirely prevent the formation of metallic tin as long as the alloying metals are prevented from appearing.

Thus the requirements of the roast include the presence of a proper amount of sulphur and a reducing gas as well as temperatures within a critical range and a certain control of the time interval of heating. The ore or mill product to be so roasted should be properly sub-divided as to particle size, which should preferably not be in excess of 65 mesh and in general the smaller the particle size the better if the process is to be efficient.

The temperature range should be above 550° C. and below 900° C., with optimum between 650° C. and 830° C. The amount of sulphur present should be substantially over the theoretical chemical requirements thereof to accomplish the reaction and the amount of hydrogen or other strongly reducing gas should always be sufficient to assure the reducing action.

As to the cooling stage, the roasted, treated and converted tin-bearing material should be cooled under non-oxidizing conditions. A variety of cooling methods can be used so long as the reduced constituents of the ore are not permitted to have any substantial reversion due to oxidation.

As to the leaching stage, the essential characteristic of this treatment is that the cooled, reduced and sulphidized ore material is subjected to the tin sulphide leaching action of a caustic alkali such as caustic soda (NaOH). The reason for this is that the tin sulphide and metallic tin are soluble in alkali whereas the gangue materials, including the iron and copper compounds, are not. So the purpose of the leaching stage is to dissolve selectively the tin compound out of the ore material, whereupon the tin compounds in solution are readily separable from the solid gangue residue.

As to the precipitation stage, the tin solution is subjected to the action of a precipitation agent such as calcium, barium, strontium or magnesium salt but preferably lime. Here, however, a requisite is that precipitation shall take place in a relatively high concentration of already precipitated solid phase of calcium-tin compounds, probably calcium orthostannate. Unless this precaution is used, a much larger amount of lime is needed, indeed as much as 300 percent of theoretical and then the precipitate yielded is low in grade, very finely divided and difficult of separation. On the other hand, if the precipitation is carried out in the presence of a high concentration or pulp blanket of already precipitated stannate, the precipitated particles are coarse crystals with a rapid settling rate and the solution is completely stripped of tin with only the theoretical quantity of lime. This means that they not only will settle quickly in the mother liquor, but are readily filterable therefrom. The separated mother liquor or filtrate which is a barren solution, is then available for recirculation and reuse as a solvent in the leaching stage.

After filtration and drying the stannate is preferably calcined to drive out the combined water, forming anhydrous calcium orthostannate, since in this form the product may be stripped more economically.

If a tin ore or a tin-bearing mill product such as tailings, is submitted, properly subdivided as to particle size, to the treatment as summarized above, and if the roasted products are leached in a weak sodium hydroxide solution, the curve of recovered tin plotted as a function of the roasting temperature for a specific time interval will show a maximum indicating a critical temperature range, which curve falls away and also shows that undesirable reactions result if the temperature is too high.

As already stated, the tin-bearing lode ores always contain sulphides, and mainly pyrite. Pyrite ($FeS_2$) decomposes into pyrrhotite ($FeS_{1.2}$) at a temperature above 575° C. The reaction is very rapid at 665° C. In the presence of hydrogen, however, the decomposition of pyrite starts at a lower temperature. Thus, the sulphur for the reaction is furnished in Bolivian tin ore by the alteration of pyrite to pyrrhotite which pyrite or its sulphur-bearing equivalent is added to the ore to supply any lack of natural constituent from which sulphur will evolve in situ, and the series of reactions involved may be represented by the following equations:

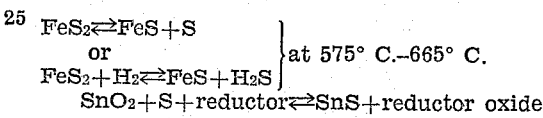

$$SnO_2 + S + \text{reductor} \rightleftarrows SnS + \text{reductor oxide}$$

If the reduction is performed with hydrogen in the presence of pyrite or other sulphur evolving constituent from which sulphur is volatilized at a temperature lower than the temperature of the main reaction, the equation may be written in summarized form as follows:

$$SnO_2 + FeS_2 + 2H_2 \rightleftarrows SnS + FeS + 2H_2O$$

The use of a large excess of pyrite is objectionable, so its use must be carefully controlled.

These reactions occur only above 550° C. Above 900° C. the tin sulphide volatilizes badly. Stannous sulphide, as already stated, is soluble in alkalis provided some oxidizing compound such as air be present. Stannous sulphide is further slowly reduced by the hydrogen to metallic tin—$SnS + H_2 = Sn + H_2S$. Pure metallic tin is also soluble in sodium hydroxide in the presence of an oxidizing agent. However, in the presence of reduced metals (Cu, Bi, Fe, etc.) the metallic tin will form alloys which are insoluble in alkalis.

These reactions are not separate as in the systematic description above, but take place simultaneously at different rates. In fact, just above the reaction temperature, $SnS_2$ is possibly formed besides SnS and some Sn. Moreover, the conditions in the furnace are also a function of the time. At the beginning, there is an excess of sulphur present, and the sulphidizing reaction is at its maximum; but when most of the sulphur has been evolved and has reacted or escaped as hydrogen sulphide, this atmosphere becomes more and more reducing.

If the sulphur available is marginal or inadequate, it is still possible to obtain fair results by carefully controlling the degree of reduction more particularly as exemplified by the time. By holding the time of contact at the reaction temperature to a minimum which may be as low as 10 minutes or so, a reasonable recovery may often be obtained, whereas longer times of 30 minutes may result in drastic lowering of the extraction obtainable with the NaOH solution.

A possible explanation of this behavior is as follows: At 650° or 700° pyrite readily breaks down into pyrrhotite, $FeS_{1.2}$, with the rest of the sulphur being liberated as $S_2$ or converted into $H_2S$. These compounds carry out the other reactions indicated and the rest is carried away. If then all of the iron is in the form of pyrrhotite and the tin in the form of SnS, we have an ideal setup. If more reducing gas is passed over the charge metallic tin may form, but metallic iron is prevented from forming for a long period because the $FeS_{1.2}$ must be substantially converted to FeS—

$$FeS_{1.2} + 0.2H_2 \rightarrow FeS + 0.2H_2S$$

before any FeS is reduced to metallic iron. It takes a large excess of $H_2$ to so reduce the $FeS_{1.2}$ to FeS: of the order of 100–1000 mols of $H_2$ per atom of sulphur removed, depending on the temperature. If only a small amount of this buffering pyrrhotite is present, practical considerations may cause enough hydrogen to be used to overcome the margin of safety which the pyrrhotite affords and cause metallic iron to be formed:

$$FeS + H_2 \rightarrow Fe + H_2S$$

which will then quickly alloy with any tin it comes in contact with and tie this tin up as an alkali insoluble particle.

If a hydrocarbon gas is used to provide the reducing atmosphere, the presence of steam as a catalyst for the cracking of the hydrocarbon is almost a requirement in order to yield high recoveries. From the roasting furnace there escapes volatilized S, $H_2S$, $AsH_3$, $SbS_3$, etc. In some cases it may be advantageous to remove the stannite prior to the reducing treatment, by flotation, acid leaching, or chlorine leach, as this mineral directly forms an alkali-insoluble compound.

The next step is the cooling, which should be done to a temperature below the melting point of tin (230° C.) and under careful control so that the ore is cooled and passed into the leaching solution in such a way as to prevent re-oxidation of the reduced ore. The leaching solution is best an alkali, like sodium sulphide, potassium sulphide, potassium hydroxide, or sodium hydroxide, and should not contain calcium ions (soft water). From an economical point of view, NaOH seems to be the best suited dissolvent. The ore is agitated with a weak solution of sodium hydroxide (containing an excess of reagent, say about five times the amount of tin to be leached) for a period of time up to the order of 25 hours. A counter-current decantation system is advantageous.

The dissolution of tin compounds in the caustic solution requires the presence of oxygen to convert the tin to the stannic condition in which state it is soluble in caustic. This oxygen can be supplied by contacting the solution with atmospheric air. However, if air be also used for agitation purposes, care should be exercised to prevent the formation of appreciable amounts of sodium carbonate.

The chemical reactions of the dissolution are as follows:

$$6SnS + 12NaOH + 3O_2 \rightarrow 4Na_2SnO_3 + 2Na_2SnS_3 + 6H_2O$$

$$Sn + O_2 + 2NaOH \rightarrow Na_2SnO_3 + H_2O$$

The strength of sodium hydroxide to be used is not important, but the total amount of NaOH present should be high enough to provide complete dissolution in a reasonable time. Seven to eight per cent by weight of NaOH on the basis of the calcined ore (containing 2% Sn) gave excellent results. The dissolution will ordinarily be conducted at whatever temperature normally obtains in the plant, but in special cases intentional temperature adjustment may be indicated by simple tests.

The best means of recovering the tin is a precipitation procedure which makes use of the addition of lime. The tin is precipitated as hydrated calcium orthostannate, containing alumina and calcium carbonate as the principal impurities. The precipitation of the Sn should preferably be carried out in the presence of previously precipitated Sn, i. e., of a precipitate of calcium stannate produced in a former cycle, for otherwise a large excess of lime would be necessary, in order to strip the solution of its Sn. If the theoretical amount of lime be added to the solution, it has been found that not more than 20% of the Sn is recovered, and it was necessary to go to 300% of theoretical to effectively precipitate the tin. But, if the lime be added to the solution in the presence of previously precipitated Sn, the calculated amount on the basis of $CaSnO_3$ reduces the tin content of the solution to a very low value. As $Na_2CO_3$ builds up in the solutions through excess of $CO_2$, a certain amount of lime is used in precipitating $CaCO_3$. Therefore, a slight excess of lime over tin is actually used in practice.

Effecting the precipitation in the presence of a 2½% suspension of previous precipitates from a concentration of 10 to 12 grams of tin per liter of solution has given excellent results. Such a step seems to scrub the solution of its supersaturation and brings the solution into equilibrium. The stannate precipitate is sandy, it settles to a low density of say 64% solids, and filters easily. Since no excess lime is used, the mother liquor can be re-used without carbonation as it is already substantially free of lime. However, if regeneration is necessary, it can be done by the use of sodium carbonate or carbon dioxide.

A very satisfactory apparatus for accomplishing this precipitation step, is a machine made and sold by The Dorr Company, Inc., of New York, as shown in United States of America Patent No. 2,259,221, to Darby, Roberts and Weber. In this apparatus, the precipitant is added to the lower part of the machine wherein flocculation takes place in a zone containing a sludge blanket. The sludge blanket rises to a level above a sludge collecting pocket from which the precipitate is drawn off, while clarified effluent overlies the sludge blanket and overflows from the upper section of the machine. The hydrated calcium orthostannate precipitate, which runs about 41% Sn, is then dewatered such as by filtering. It contains 5 molecules of crystallization water, which are expelled at about 500° C. or below yielding a calcined product with more than 50% Sn. The latter may be directly smelted to recover the tin, or may be treated in various ways to arrive at the final metallic tin.

Other methods of recovering the dissolved tin values from the alkaline leaching medium are possible and in certain cases may be economically more desirable. One of these is to carbonate the alkaline solution with a $CO_2$ containing gas in the presence of an electrolyte such as NaCl if the solutions are rather dilute. In this case the tin is precipitated as hydrated stannic oxide which may be separated, dried and calcined to yield a high-grade product. Or $SO_2$ may be used as a precipitating agent. The remaining solution is regenerated with a controlled amount of lime.

Direct electrolysis of the solution is also a possibility with the production of electrolytic metal, which may be then melted down and cast into bars. The tin may also be precipitated from solution in the metallic state by means of zinc dust, preferably after deaerating. In this case, zinc hydroxide will also be separate and may be recovered separately.

Example 1

Fine slime tailings from the Telamayu (Aramayo Company, Bolivia), containing 2.49% Sn (of which 10% as stannite and the rest as cassiterite) as well as pyrites and other metallic sulphides, were heated in a rotary kiln to 799° C. The heating period was 22 minutes in an atmosphere of hydrogen and water vapor, provided by saturation of the reducing gas in water heated to 51° C. The kiln was rapidly cooled and the ore leached at a dilution of 5:1 with an 0.8% sodium hydroxide solution. After 20 hours, 70.04% of the tin contained in the ore was extracted. A second leach with a fresh solution containing 0.8% NaOH gave an additional recovery of 8.5%. Thus, the total recovery was 78.54%.

Example 2

Composite tailings from the Telamayo Mine (Aramayo Company, Bolivia), containing 1.80% Sn and 4.5% S, principally as pyrite, was batch roasted in a rotary kiln to 799° C. for 25 minutes in a current of hydrogen, and cooled in the same gas. The calcine containing 1.94 Sn, was leached with 20 gpl. NaOH solutions in a cyclic test procedure simulating counter-current leaching and decantation. The pregnant solutions were precipitated with lime in the presence of previously precipitated material and the barren solutions reused. The test was continued for 10 cycles and an average extraction of 83% and a tin recovery as $CaSnO_3$ of around 80% was obtained. The final product after calcining contained 51.4% Sn. Smelting tests on the latter product with the addition of $SiO_2$ and $Fe_2O_3$ gave high recoveries of metallic tin.

Figure 2:
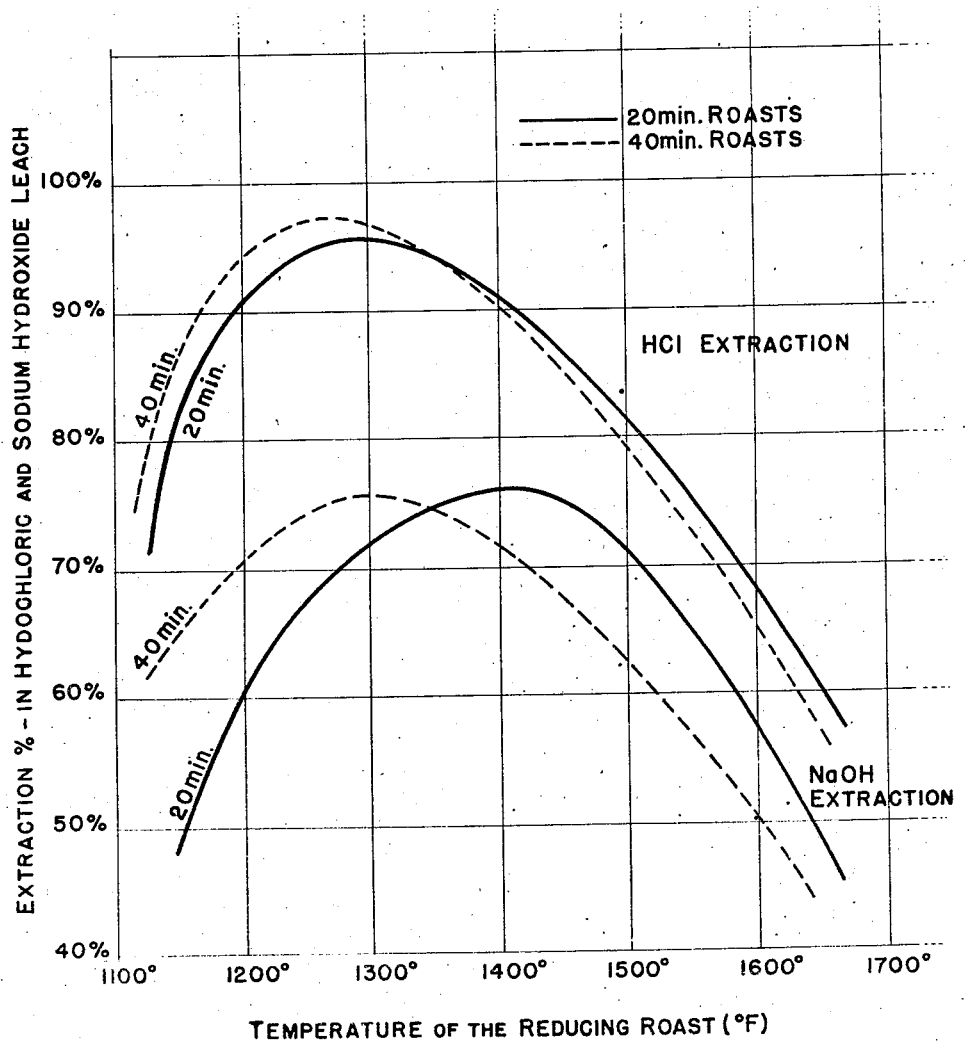

Drawings accompany this specification for aiding in an understanding of the invention, in which Fig. 1 shows a graph based upon tests showing the critical temperature factor for two different time intervals (combined of course with the proper reducing and sulphidizing conditions), while Fig. 2 is a diagrammatic flowsheet to indicate in general the sequence of machines or apparatus usable to practice the invention on a commercial scale.

In Fig. 2 of the drawings, 11 indicates a furnace or kiln in which the ore is subjected to a reducing-sulphidizing roast, to which furnace the ore 12 is fed together with a suitable reducing gas 13. The furnace may also have fed to it pyrite 15 or other source of sulphur, but if pyrite be used, an excess of pyrite is detrimental in the leaching, so the quantity used should be carefully controlled. In the event that a tin ore to be treated has a sufficient sulphur content naturally in it, of course pyrite need not be added. From the furnace 11, gaseous products 16 of the reaction are emitted in the form mainly of sulphur and hydrogen-sulphide but these will also contain other products such as $AsH_3$, $SbS_3$, and the like. The hot solid reaction products are discharged from the furnace 11 into a cooling apparatus or station 17 so that they will be cooled quickly in a manner to prevent or minimize their re-oxidation. From the cooling apparatus 17 the solid reaction product passes through pipe 18 and is subjected to a leaching treatment in a leaching station 19, which as shown in the diagram includes an agitator. It is contemplated that this leaching station will contain suitable agitators, together with a succession of thickeners for practicing what is commonly known as counter-current decantation or counter-current leaching and decantation. The reaction product is subjected in the leaching station 19 to action thereon by an alkaline leaching solvent, such as sodium hydroxide, and in the leaching station the tin goes into solution. The solution pregnant with the dissolved tin passes as effluent from the leaching station 19 through pipe 20 into a precipitation station 21 which is housed within a machine to which there is also supplied through pipe 22 a precipitating agent, such as the hydroxides, oxides or salts of calcium, barium, strontium, magnesium, or the like.

The precipitation station or machine 21, in the preferred form is described in the aforementioned patent, and includes within its tank an assembly 23 of rotatable flocculating paddles or blades, and a sludge receiving and collecting pocket 24 from which sludge is withdrawn through a pipe 25 and conducted to a filter 26 or other dewatering apparatus. The precipitating agent precipitates or strips the tin out from the pregnant solution that enters the machine or tank 21, and this solid precipitate is removed from the tank in the form of sludge that is dewatered on the filter 26. Filtercake from filter 26 passes to a calciner station 27 from which calcium stannate 28 emerges suitable for smelting or other treatment for recovering its tin content.

So much for the direct steps. But the process of this invention can be carried out continuously and cyclically. To that end, the mud or pulp that forms a sediment in the leaching station or thickener 19 is raked to discharge whereupon it is conducted through pipe 29 to a dewatering and washing or filter station 30. From this filter, there are two discharges, namely, one by which the filter cake of mud or pulp from which the solution has been substantially removed passes to discard or waste as at 31, and the other is the alkali solution filtrate or leaching liquor containing some tin which passes through pipe 32 on its way back into the leaching station 19. Supernatant effluent from the precipitation station 21 overflows from the upper section thereof in the form of an alkali solution substantially barren of tin in solution, and is conducted through pipe 33 back to the leaching station 19.

Assuming now that an operator has a plant ready to start up and he wants to determine the quantities of materials to use; the non-carbonate tin ore or material is analyzed to determine the amount of volatilizable sulphur needed in the kiln. The ore usually comprises tin compounds, divided into a major portion of tin oxide and a minor portion of tin-sulphide complex. Other constituents are iron oxides and sulphides as well as silicates of various kinds. The tin, sulphur and reactible iron content is determined analytically. Then there is calculated the quantity of sulphur needed chemically to be equivalent to the tin and iron. In such a calculation it is best to figure the tin as SnS and the iron as $FeS_{1.2}$. If insufficient S is shown by the calculation, pyrite is added to make up the difference. It is apparent that there is available for tin and oxide iron compounds 0.8 atom of sulphur per mol of $FeS_2$. Some excess of sulphur above that so calculated makes the reduction less critical as to timing but too much is undesirable. This then comprises the burden of the kiln, and hydrogen or hydrogen containing reducing gas is continually passed through the kiln during the heat treatment stage when the tin oxide is converted to stannous sulphide while the sulphur minimizes reduction of iron compounds to metallic iron. As the resulting tin compounds are soluble in alkalis while the iron compounds are insoluble, an alkali leach causes the dissolving of the tin compounds, leaving the iron compounds as solid residue. Therefore, conjoint requirements for the practice of this invention are exemplified, for instance, in the sulphidizing reducing roast treated at a reaction temperature within a specific range followed by alkali leaching, followed by a special precipitation stage if unusual efficiency is to be realized therein, and then calcination of the separate precipitated tin compound or other tin recovery step, with the leaching operation being cyclic.

We claim:

1. The process of treating tin ore, which comprises heating the ore during a controlled period of time above 550° and below 800° C. in a strongly reducing atmosphere and in the presence of enough sulphur so that stannous sulphide and metallic tin are formed and so that the iron in the final product is in the form of its sulphide stable at the reaction temperature, and under such conditions to insure that tin sulphide is not volatilized; cooling said treated material under non-oxidizing conditions; leaching out the treated material with a solution of an alkaline metal hydroxide in the presence of enough oxygen to transform (1) substantially completely metallic tin into an alkali metal stannate salt, and (2) stannous sulphide into an alkali metal stannate salt and a salt of alkali metal, tin and sulphur; and precipitating a tin compound from this solution.

2. The process according to claim 1, characterized in that the period during which said ore material is heated and the temperature at which it is heated are such that the formation of other metals adapted to alloy with tin is minimized.

3. The process according to claim 1, characterized in that the solution pregnant with tin is reacted with a metal oxide selected from the group consisting of calcium oxide and barium oxide to precipitate a tin compound.

4. The process according to claim 1, in that the solution pregnant with tin is reacted with a metal oxide selected from the group consisting of calcium oxide and barium oxide to precipitate a tin compound, regenerating at the same time the alkaline metal hydroxide solution, separating the precipitate and the solution, and re-using the said solution to leach the cooled reduced ore.

5. The process according to claim 1, characterized in that the solution pregnant with tin is reacted with calcium oxide to precipitate calcium stannate, the precipitation step being conducted in the presence of an excess of previously precipitated calcium stannate.

6. The process according to claim 1, characterized in that the solution pregnant with tin is subjected to neutralization by an acid reagent chosen from the group consisting of $CO_2$ and $SO_2$ for precipitating a tin compound out of the pregnant solution, separating the precipitate and solution, and regenerating the solution with a controlled amount of lime.

GREGOIRE GUTZEIT.
ELLIOTT J. ROBERTS.
ROBERT B. THOMPSON.